United States Patent [19]

Shimada

[11] Patent Number: 4,799,988

[45] Date of Patent: Jan. 24, 1989

[54] APPARATUS FOR MANUFACTURING AUTOMOTIVE SEATS

[75] Inventor: Makoto Shimada, Akishima, Japan

[73] Assignee: Tachi-S Co., Ltd., Tokyo, Japan

[21] Appl. No.: 888,795

[22] Filed: Jul. 23, 1986

[51] Int. Cl.[4] ........................ B32B 31/20; B32B 31/04; B32B 31/06

[52] U.S. Cl. .................................... 156/475; 156/219; 156/220

[58] Field of Search ................. 156/91, 209, 219, 220, 156/553, 475; 5/481, 472; 428/158, 159, 160; 264/275, 278

[56] References Cited

U.S. PATENT DOCUMENTS

| | | | |
|---|---|---|---|
| 1,482,185 | 1/1924 | Egerton | 156/219 X |
| 2,578,709 | 12/1951 | Lyijynen | 156/219 X |
| 2,618,581 | 11/1952 | Lyijynen | 156/220 X |
| 4,323,410 | 4/1982 | Urai | 428/159 X |
| 4,400,422 | 8/1983 | Smith | 156/209 X |
| 4,432,822 | 2/1984 | Adams et al. | 156/245 X |

FOREIGN PATENT DOCUMENTS

| | | |
|---|---|---|
| 5017525 | 5/1975 | Japan . |

*Primary Examiner*—Michael W. Ball
*Assistant Examiner*—Jeff H. Aftergut
*Attorney, Agent, or Firm*—Oldham & Oldham

[57] ABSTRACT

A seat for use in an automobile is disclosed which is formed by bonding a seat surface covering to a cushion previously foamed and shaped by a mold to conform to the outside configuration of the seat. The seat surface covering is formed by joining together a large number of pieces of woven fabric such that it can be brought into close contact with the uneven surface of the cushion. The joint portions of the seat surface covering are fixed to a projected portion provided in a shaping die having a shaping surface which is formed to conform to the uneven surface configuration of the cushion before the seat surface covering is bonded to the surface of the cushion. As a result of this, the seat surface covering can be bonded to the cushion without being twisted or distorted.

3 Claims, 3 Drawing Sheets

APPARATUS FOR MANUFACTURING AUTOMOTIVE SEATS

BACKGROUND OF THE INVENTION

1. Field of the Invention

The present invention relates to an automotive seat and apparatus for making the same, and, more particularly, to an automotive seat which is formed by adhesively attaching a seat surface covering to the surface of a mass of cushion providing material previously foamed and shaped into a form to conform to the outside form of the automotive seat by use of a mold and apparatus for making such automotive seat.

2. Description of the Prior Art

Conventionally, an automotive seat of this kind is disclosed in U.S. Pat. No. 4,403,356 which is produced in the following manner. That is, a seat surface covering formed of a single piece of vinyl leather or like material impermeable to air is placed onto a die for the seat surface covering: next, the seat surface covering is heated and stretched by use of a heater; the seat surface covering is shaped onto a required configuration by means of a die for a mass of cushion providing material; and then, after a bonding agent is applied to the mass of cushion providing material, pressure is given to the mass of cushion providing material to bond it to the seat surface covering.

Accordingly, the above-mentioned patent can apply only to an automotive seat including a seat surface covering which can be thermally stretched. In other words, in the above patent, woven fabric of natural fiber having no thermoplasticity can not be employed for the seat surface covering. Also, since the seat surface covering is formed of a single piece of material, for example, it is impossible to produce such a seat surface covering which is composed of separate sections respectively corresponding to the portions of the surface of the mass of cushion providing material requiring elasticity and not requiring elasticity.

Also, in another prior art method of manufacturing a seat for an automobile, as shown in FIG. 11, a seat surface covering of natural fiber having no thermoplasticity is first fixed to a shaping die (06) and is then bonded to a mass of cushion providing material (08) so as to provide a seat as shown in FIG. 12.

Specifically, in FIGS. 11 and 12, (01) designates a seat surface covering; (02) a center portion of the seat surface covering (01) providing a seating surface of a seat; (03) side portions of the seat surface covering (01) providing end side surfaces of the seat, respectively; (04) joints to be joined by various means; (05) welts; (06) a shaping die; (07) clamps for gripping the welts (05) therebetween; and, (08) a mass of cushion providing material previously foamed so as to be provided with projections and a recessed portion on the upper surface thereof using a mold.

In the conventional seat shown in FIGS. 11 and 12, fixation of the seat surface covering when the joints (04) thereof are formed is accomplished as follows: the center portion (02) is connected to the side portions (03) via the welts (05); the welts (05) are fixed onto the shaping die (06) by use of the clamps (07) mounted to the shaping die (06) to position the seat surface covering; and then, in this state, the seat surface covering (01) is attached to the mass of cushion providing material (08), that is, the upper surface thereof by a bonding agent. However, this fixing method cannot apply to a case where the seat surface covering (01), more particularly, the center portion (02) thereof is provided with two or more kinds of different physical properties (material, color, pattern or the like), because the different physical properties make it impossible for the joints (04) to be joined properly.

Also, in the above-mentioned prior art, since it is difficult to provide fitting means such as clamps for fixing the seat surface covering (1) firmly to the surface of t he shaping die when it is bonded, it is difficult to manufacture a seat which allows a variety of designs, provides a beautiful appearance in the joint portions thereof, and has no distorted portions on the surface thereof. By the way, the distorted portions or distortions are produced when the seat surface covering is bonded, and the greater distortions occur especially when seat surface covering components of different physical properties are adhesively joined together to form a complete seat surface covering.

SUMMARY OF THE INVENTION

The present invention aims at eliminating the drawbacks found in the above-mentioned prior art automotive seat.

Accordingly, it is an object of the invention to provide an improved automotive seat which prevents the joint portions thereof from displacing when a seat surface covering thereof is attached to a cushion by a bonding agent by use of a shaping die, and which is thus provided with the beautiful joint portions having no distortions therein.

In achieving this object, according to the invention, a large number of fabric materials of different physical properties are joined together to form a center portion of a seat surface covering; the center portion of the seat surface covering is formed so as to match the shape of the uneven upper surface of a complete seat which is provided with a bucket portion and the like; and, the thus formed center portion of the seat surface covering is adhesively attached to a cushion which is formed so as to match the outside shape of the complete seat.

It is another object of the invention to adhesively attach the center portion of the seat surface covering formed by joining many pieces of fabric material of different physical properties to the cushion with no distortions being produced on the seat surface covering.

To attain this object, according to the invention, there is provided a projected portion for fixing joint portions of the seat surface covering in a shaping die located along the uneven upper surface of the cushion. That is, when the joint portions of the seat surface covering are fixed to the projected portion of the shaping die, then the entire central portion of the seat surface covering is fixed to the shaping die. As a result of this, when the central portion of the seat surface covering together with the shaping die is pressed against and bonded to the upper surface of the cushion, there is no possibility of the center portion of the seat surface covering being displaced, so that the center portion of the seat surface covering can be bonded to the cushion without producing any distortions or saggy portions in the seat surface covering. Also, since the joint portions are also fixed to the projected portion of the shaping die, there is eliminated a possibility of the joints being meandered or twisted. Further, since the joint portions together with the above-mentioned projected portion of the shaping die are casued to intrude into the cushion when the center portion of the seat surface covering is bonded under pressure, there is obviated the possibility that the joint portions, after bonded, may be projected beyond the upper surface of the center portion of the seat surface covering. Therefore, in the invention, it is possible to provide a seat which is beautiful in appearance.

It is still another object of the invention to eliminate a danger of damage to the seat surface covering when the seat surface covering is fixed to the shaping die.

In accomplishing this object, according to the invention, the above-mentioned projected portion of the shaping die is caused to intrude into the joint portions forming the center portion of the seat surface covering. Due to this, the seat surface covering is protected not only against damage but also against deformation, which makes it possible to provide a seat which is beautiful in appearance.

It is a further object of the invention to provide a seat which can offer a more comfortable sitting touch as well as is improved in appearance and durability.

In order to realize the above object, according to the invention, many pieces of fabric material respectively having different physical properties (such as flexibility, permeability, color, material) are employed or joined together to form the center portion of the seat surface covering of the seat of the entire seat surface covering of the seat. For example, a section of the seat surface covering corresponding to the section of the cushion that is most flexed in use is formed of the most flexible piece of fabric material, while a section of the seat surface covering corresponding to the section of the cushion that requires no flexibility is formed of a stiff piece of fabric material.

These and other objects and many of the attendant advantages of this invention will be readily appreciated as the same becomes better understood by reference to the following detailed description when considered in connection with the accompanying drawings.

DETAILED DESCRIPTION OF PREFERRED EMBODIMENTS OF THE INVENTION

Figure 1:
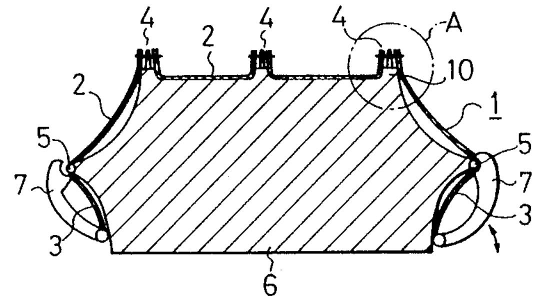
FIG. 1 is a section view to show how to fix a seat surface covering constructed in accordance with the invention.

Referring first to FIG. 1, there is illustrated a seat surface covering (1) which is fixed to a shaping die (6). This shaping die (6) has an upper portion which is formed in the same shape as that of the uneven upper surface of a cushion (8) previously foamed by a mold into the outside configuration of a seat.

Figure 2:
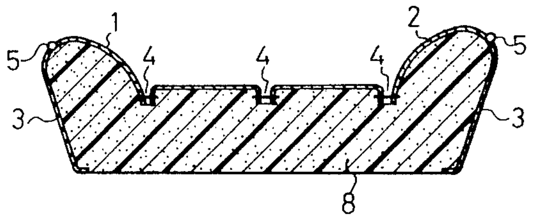
FIG. 2 is a section view of a seat constructed in accordance with the invention.
Figure 3:
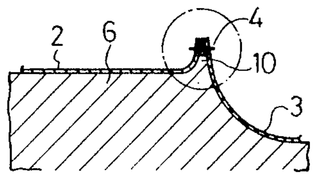
FIG. 3 is is an enlarged section view of A portion shown in FIG. 1.

The seat surface covering (1) comprises a center portion (2) and side portions (3), (3) which are respectively connected through welts (5), (5) to the outer sides of the center portion (2). The center portion (2) of the seat surface covering (1) is formed by joining many pieces of fabric material together and is sewn such that it can be brought into close contact with the upper surfce of the cushion or a mass of cushion providing material (8). In the drawings, (4), (4), (4) designate the joint portions of the center portion (2), respectively. These joint portions (4), (4), (4), as shown in FIG. 3, are respectively inserted into a projected portion (10) provided in the shaping die (6), with the result that the center portion (2) of the seat surface covering (1) can be fixed to the shaping die (6). Also, the welts (5) are fixed by clamps (7) provided on the side surfaces of the lower portion of the shaping die (6), similarly as in the prior art. After the seat surface covering (1) is fixed to the shaping die (6) in the above-mentioned manner, if the mass of cushion providing material (8) is bonded to the fixed seat surface covering (1) by a bonding agent, then a seat as shown in FIG. 2 can be obtained.

Figure 4A:
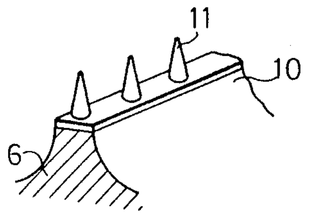
FIG. 4*a* is a perspective view of a projected portion formed in a shaping die and used to fix the seat surface covering in accordance with the invention.
Figure 4B:
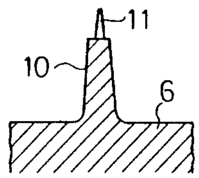
FIGS. 4*b* and 4*c* are respectively section views of another embodiment of the projected portion.
Figure 4C:
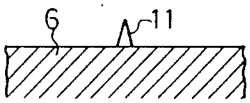

Specifically, the above-mentioned bonding is carried out by applying the bonding agent to the upper surface of the seat surface covering (1) fixed to the shaping die (6) or to the upper surface of the mass of cushion providing material (8), and giving pressure to the seat surface covering (1) together with the shaping die (6). In such bonding under pressure, the joint portions (4), (4), (4) can be bonded properly without being twisted or slackened, because they are fixedly secured by the projected portion (10) of the shaping die (6). The above-mentioned projected portion (10) is provided as a strip projection in the shaping die (6) such that it can extend along the joint portions (4), (4), (4) forming the center portion (2) of the seat surface covering (1). Typical examples of the projected portion (10) are illustrated in FIGS. 4*a* and 4*b*. That is, each of them is provided with one or more needles (11) as a portion thereof in the extreme end thereof so as to be able to fix the seat surface covering more positively. Especially in FIG. 4*b*, the projected portion (10) composed of the strip-like projection is formed thin and is provided with the needle (11) on the top surface thereof. This type of projection can be used effectively when the joint portion is formed tight or close. In this case, the needle has a leading end which is formed slightly round. In FIG. 4*c*, the strip-like projection (10) is not provided, but the projected portion is formed by a needle (11) only.

Figure 5:
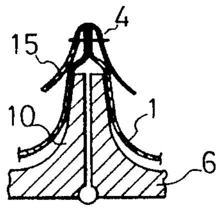
FIG. 5 is a section view to show how to fix a seat surface covering when it is formed of woven fabric.

In FIG. 5, there is illustrated another embodiment which can be applied to a case when the seat surface covering (1) is formed of woven fabric and thus is permeable to air. Specifically, a film of vinyl chloride or the like is attached to the back surface of the joint portion (4) and then the joint portion (4) is vaccum drawn by a suction pipe (14) for fixation thereof. In this case, the projected portion (10) is composed of a strip-like projection and is formed with a through-bore through which the suction pipe (14) can perform its vaccum drawing operation. However, according to the degree of the permeability or the degree of the suction, the film of vinyl chloride may not be attached.

Figure 6A:
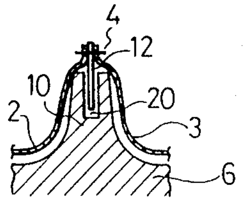
FIG. 6*a* is a section view of another embodiment of the projected portion in which it is formed with a slit.
Figure 6B:
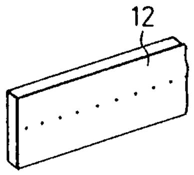
FIG. 6*b* is a perspective view of a plate to be inserted into the slit shown in FIG. 6*a*.

In FIG. 6*a*, there is illustrated another embodiment in which the projected portion (10) of the shaping die (6) is formed with a slit (20). In this embodiment, a plate 12 ( which is shown in enlarged form in FIG. 6*b*) formed of resin, cardboard or like material that can be held by hand is inserted into the joint portion (4) for joining the center portion (2) and side portions (3) of the seat surface covering (1), is temporarily sewn by a sewing machine, is inserted the slit (20) of the shaping die (6), and, after the joint portion (4) is completed or the seat surface covering (1) is finished, is removed therefrom by hand.

Figure 7:
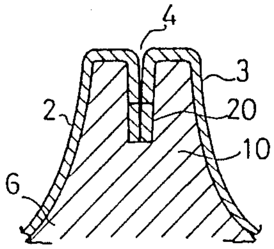
FIG. 7 is a section view of another embodiment of the projected portion formed with a slit into which a joint portion is inserted.

Referring now to FIG. 7, there is shown another embodiment in which there is formed a slit (20) in the leading end of the projected portion (10) of the shaping die (6) and the joint portion (4) is inserted into and fixed to the slit (20).

Figure 8:
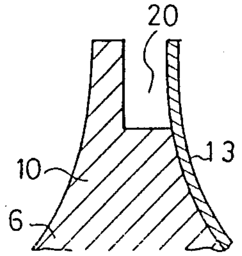
FIG. 8 is a section view of another embodiment of a slit formed in the projection.

In FIG. 8, there is illustrated another embodiment in which one side portion of the projected portion (10) is cut away and a plate-like spring or leaf spring 13 is attached to the projected portion (10) so as to extend along the cutaway portion of the projected portion (10), with the result that the slit (20) for fixing the joint portion is formed between the leaf spring (13) and the other side portion of the projected portion (10).

Figure 9:
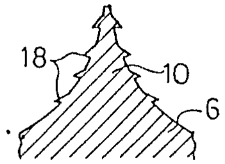
FIGS. 9 and 10 are section views of another embodiments of the projected portion of the shaping die which allow the seat surface covering to be fixed with greater retaining forces.

In FIG. 9, there is illustrated another embodiment in which the projected portion (10) of the shaping die (6) is provided with notched clincher tongues 18 similar to the teeth of a file, so that the joint portion (4) can be retained more securely.

Figure 10:
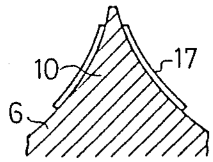
Figure 11:
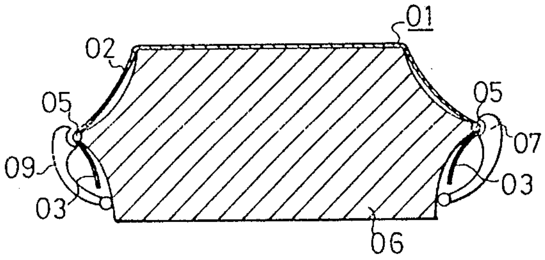
FIG. 11 Prior Art
FIG. 11 is a section view to show a conventional method of fixing a seat surface covering; and, FIG. 12 is a section view to show designations of parts of a seat.
Figure 12:
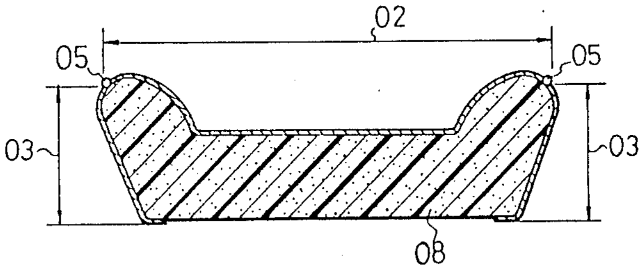
FIG. 12 Prior Art

In FIG. 10, there is shown still another embodiment in which the projected portion (10) is equipped with a velvet-type fastener (17) so as to facilitate the fixation of the seat surface covering (1), although the use of the velvet-type fastener (17) is limited by the material of the seat surface covering (1).

As has been described hereinbefore, according to the invention, the seat surface covering can be fixed positively to the shaping die, which permits a combined use of plural pieces of seat surface covering material having different physical properties and eliminates the possibility of the joint portions of the seat surface covering being twisted or distorted when the seat surface covering is bonded. Therefore, the invention can produce a seat which is beautiful in appearance.

What is claimed is:

1. An apparatus for manufacturing an automotive seat comprising a shaping die having a shaping surface shaped to conform to a surface configuration of said seat, and a projected portion provided at a suitable position on said shaping surface of said shaping die for fixing a joint portions of a seat surface covering wherein said projected portion for fixation of said joint portions comprises a plate-like body which is provided in one side thereof with a leaf spring for gripping said joint portions of said seat surface coverings, and wherein said joint portions are fixed to said projected portion, and wherein further, said seat surface covering pressed against said shaping surface is connected to a cushion formed to conform to the configuration of said seat.

2. Apparatus for manufacturing an automotive seat comprising a shaping die having a shaping surface shaped to conform to a surface configuration of said seat, and a projected portion provided at a suitable position on said shaping surface of said shaping die for fixing joint portions formed on a seating portion of a seat surface covering, wherein said joint portions are fixed to said projected portion, and said projected portion is adapted to fixedly retain said joint portions from movement, wherein said projected portion for fixation of said joint portions comprises a strip-like projection which is provided on side walls thereof with a plurality of tongues for retaining said joint portions of said seat surface covering, and wherein said seat surface covering pressed against said shaping surface is connected to a cushion conformed to the configuration of said seat.

3. Apparatus for manufacturing an automotive seat comprising a shaping die having a shaping surface shaped to conform to a surface configuration of said seat, and a projected portion provided at a suitable position on said shaping surface of said shaping die for fixing joint portions formed on a seating portion of a seat surface covering, wherein said joint portions are fixed to said projected portion, and said projected portion is adapted to fixedly retain said joint portions for movement. Wherein said projected portion for fixation of said joint portions comprises a strip-like projection which is provided with a velvet-type fastener for fixing said joint portions of said seat surface covering, and wherein said seat surface covering pressed against shaping surface is connected to a cushion conformed to the configuration of said seat.

* * * * *